United States Patent [19]

Urakami

[11] Patent Number: 5,752,577

[45] Date of Patent: May 19, 1998

[54] DEVICE CAPABLE OF SUCTION-ADHERING TO SURFACE OF OBJECT AND MOVING THEREALONG

[75] Inventor: Fukashi Urakami, Yokohama, Japan

[73] Assignees: Honda Giken Kogyo Kabushiki Kaisha, Tokyo; Urakami Research & Development Co., Ltd., Kanagawa, both of Japan

[21] Appl. No.: 397,138

[22] PCT Filed: Jul. 22, 1994

[86] PCT No.: PCT/JP94/01209

§ 371 Date: Mar. 9, 1995

§ 102(e) Date: Mar. 9, 1995

[87] PCT Pub. No.: WO95/03205

PCT Pub. Date: Feb. 2, 1995

[30] Foreign Application Priority Data

Jul. 23, 1993 [JP] Japan .................................. 5-224982

[51] Int. Cl.[6] .................................................. B62B 39/00
[52] U.S. Cl. .................................... 180/164; 180/901
[58] Field of Search .............................. 180/164, 901, 180/9, 9.1; 114/222; 248/205.9, 206.4

[56] References Cited

U.S. PATENT DOCUMENTS

| 4,095,378 | 6/1978 | Urakami | 180/901 X |
| 4,560,418 | 12/1985 | Raubenheimer | 134/18 |
| 4,926,957 | 5/1990 | Urakami | 180/164 |
| 4,934,475 | 6/1990 | Urakami | 180/164 |
| 5,007,210 | 4/1991 | Urakami | 180/164 X |
| 5,014,803 | 5/1991 | Urakami | 180/164 |

FOREIGN PATENT DOCUMENTS

| 33 33 633 | 3/1984 | Germany . | |
| 94/25328 | 11/1994 | WIPO | 180/164 |
| 94/27856 | 12/1994 | WIPO | 180/164 |

Primary Examiner—Kevin Hurley
Attorney, Agent, or Firm—Beveridge, DeGrandi, Weilacher & Young, L.L.P.

[57] ABSTRACT

A device capable of suction-adhering to and moving along the surface of an object includes a pressure reduction housing, a suction-adhering seal mounted on the pressure reduction housing and defining a pressure reduction space in cooperation with the pressure reduction housing and the surface of the object, and a vacuum generator for discharging a fluid from the pressure reduction space to the outside of the pressure reduction space. The device suction-adheres to the surface of the object by the pressure of an ambient fluid acting on the pressure reduction housing owing to the difference in fluid pressure between the inside and the outside of the pressure reduction space. The device is moved along the surface of the object by driven wheels which engage the surface. At least that portion of the suction-adhering seal which contacts the surface of the object vibrates in a manner which creates a dynamic friction force to decrease the frictional force between the suction-adhering seal and the surface of the object.

11 Claims, 6 Drawing Sheets

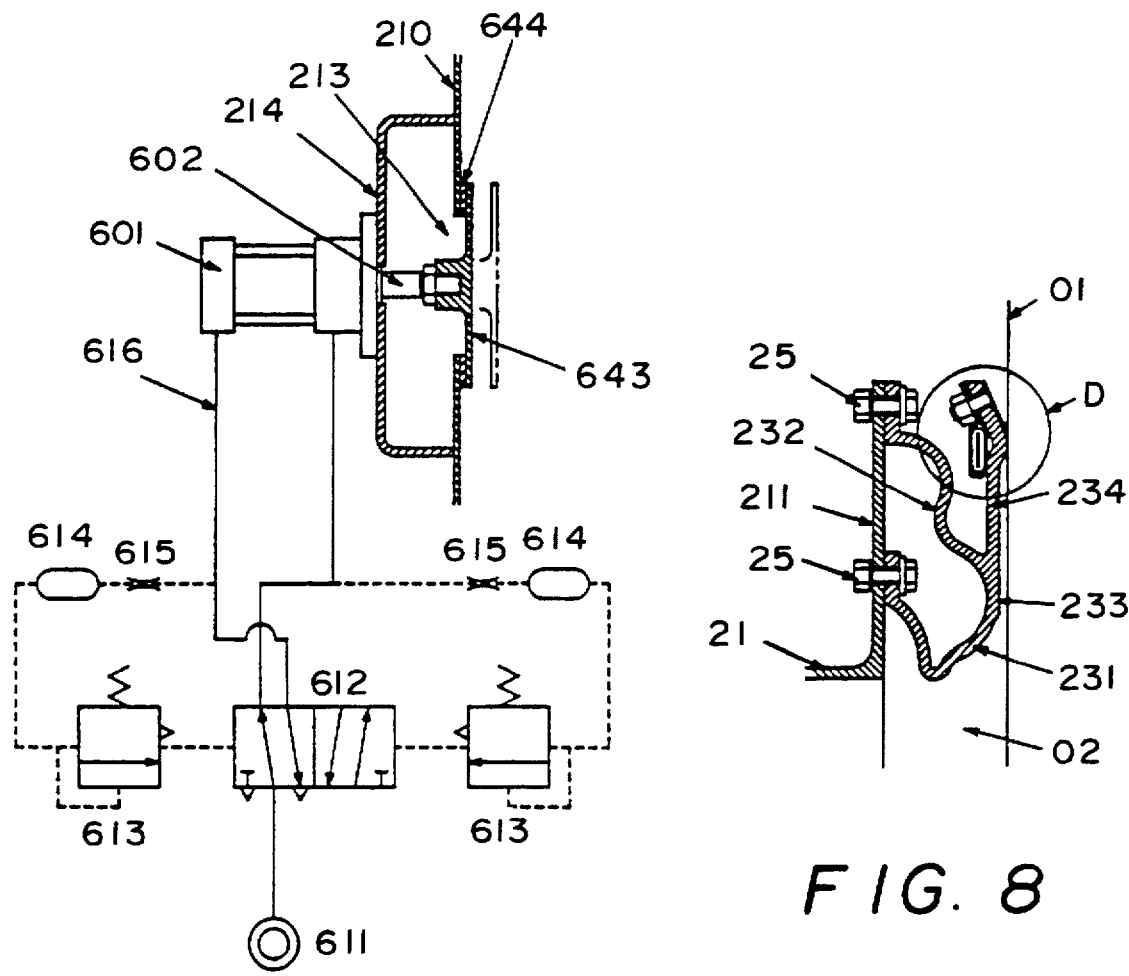
FIG. 7
FIG. 8
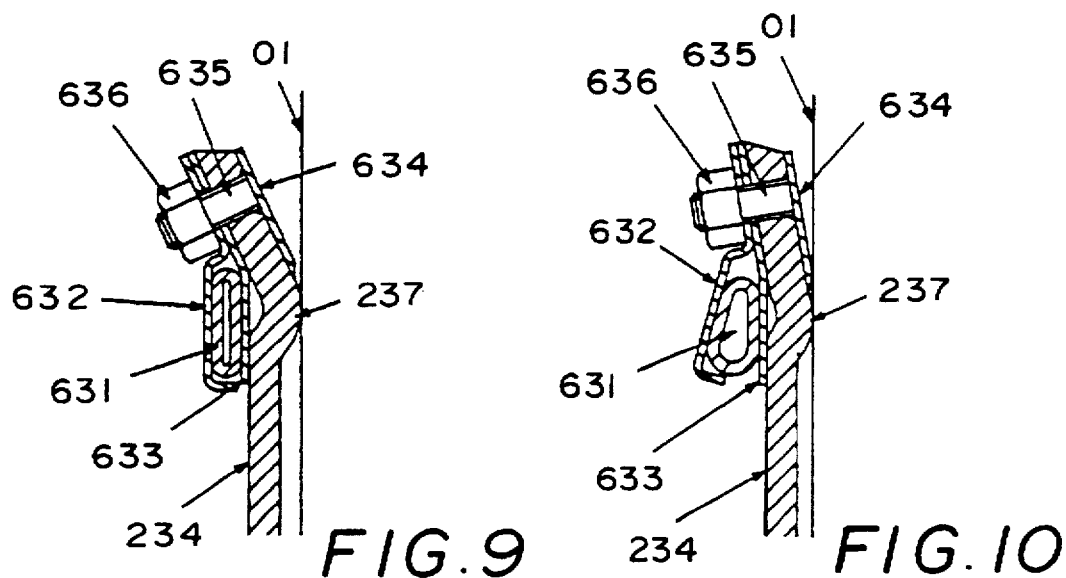
FIG. 9
FIG. 10

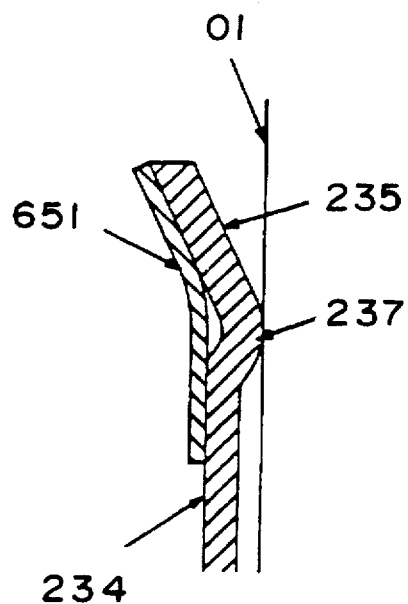
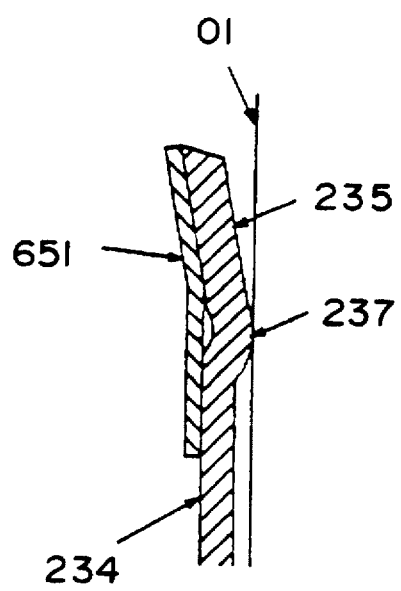
FIG. 15  FIG. 16
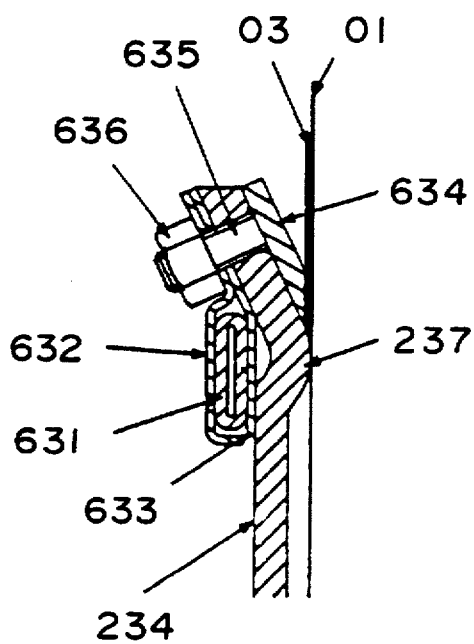
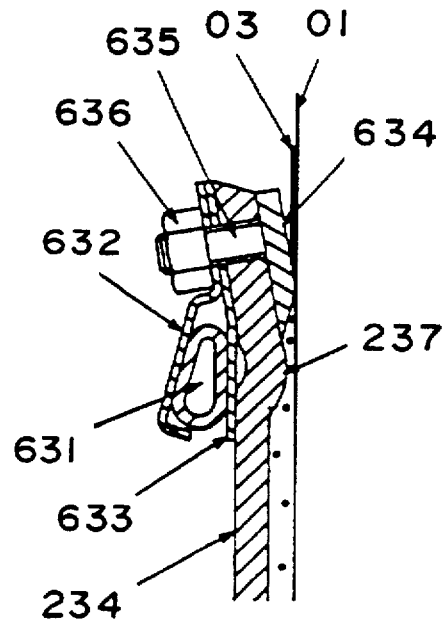
FIG. 17  FIG. 18

1

DEVICE CAPABLE OF SUCTION-ADHERING TO SURFACE OF OBJECT AND MOVING THEREALONG

TECHNICAL FIELD

This invention relates to a device capable of suction-adhering to a surface by the pressure of an ambient fluid such as air or water, and of moving along it.

BACKGROUND ART

An example of a device capable of suction-adhering to and moving on various inclined or substantially vertical wall surfaces of a ship, a building or the like is the device disclosed in Japanese Patent Publication No. 26752/85 (the specification and drawings of U.S. Pat. No. 4,095,378).

Such a device has a pressure reduction housing, a moving means such as wheels, a suction-adhering seal mounted on the pressure reduction housing and defining a pressure reduction space in cooperation with the pressure reduction housing and the wall surface, and a vacuum generating means for discharging a fluid from the pressure reduction space to its outside. In this device, when the vacuum generating means is energized, fluid inside the pressure reduction space is discharged to the outside. Owing to the difference in fluid pressure between the inside and outside of the pressure reduction space, the fluid pressure acts on the pressure reduction housing, and is then transmitted to the wall surface via the wheels. Under this fluid pressure, the device suction-adheres to the wall surface. In this state of suction-adhesion, when the wheels are rotationally driven by a driving means such as an electric motor, the device moves upwards along the wall surface if the frictional force between the wheels and the wall surface, i.e., the driving force of the wheels, exceeds the sum of the frictional force between the suction-adhering seal and the wall surface and the weight of the device.

The device is equipped with a working unit such as a polishing and cleaning material ejecting means which directs a jet of a polishing and cleaning material at the surface.

The conventional device described above presents with the following problems to be solved:

Assume that the conventional device is traveling upwards while suction-adhering to a coated wall surface with a decreased friction coefficient attributed to the deterioration of the coating or to a water-wetted wall surface. Its upward travel may become difficult because the wheels slip.

DISCLOSURE OF THE INVENTION

A primary technical challenge for the present invention is, therefore, to provide a device capable of suction-adhering to and moving along the surface of an object, which has a stable driving force imparted by causing at least that portion of the suction-adhering seal contacting the surface of the object to vibrate, thereby decreasing the frictional force between the suction-adhering seal and the surface of the object.

A secondary technical challenge for the present invention is to provide a device capable of suction-adhering to and moving along the surface of an object, which, when applied to uses for suction-cleaning dirt, such as crud, deposited on the surface of an object mainly in a liquid, can effectively incorporate the crud on the surface of the object into the pressure reduction region by causing at least that portion of the suction-adhering seal contacting the surface of the object to vibrate.

To overcome the above primary technical challenge, the present invention provides a device capable of suction-adhering to and moving along the surface of an object, which device has a pressure reduction housing, a moving means, a suction-adhering seal mounted on the pressure reduction housing and defining a pressure reduction space in cooperation with the pressure reduction housing and the surface of the object, and a vacuum generating means for discharging a fluid from the pressure reduction space to the outside of the pressure reduction space, and which device suction-adheres to the surface of the object by the pressure of an ambient fluid acting on the pressure reduction housing owing to the difference in fluid pressure between the inside and the outside of the pressure reduction space, and moves along the surface of the object by the action of the moving means; wherein at least that portion of the suction-adhering seal contacting the surface of the object is caused to vibrate.

To overcome the secondary technical challenge, the present invention provides a device capable of suction-adhering to and moving along the surface of an object, which device has a pressure reduction housing, a moving means, a suction-adhering seal mounted on the pressure reduction housing and defining a pressure reduction space in cooperation with the pressure reduction housing and the surface of the object, and a vacuum generating means for discharging a fluid from the pressure reduction space to the outside of the pressure reduction space, and which device suction-adheres to the surface of the object by the pressure of an ambient fluid acting on the pressure reduction housing owing to the difference in fluid pressure between the inside and the outside of the pressure reduction space, and moves along the surface of the object by the action of the moving means; wherein the suction-adhering seal is formed of a flexible material such as rubber, and has an annular lip portion extending outwardly from the inside of the pressure reduction space and along the surface of the object, an extension extending further outwardly and away from the surface of the object is connected to the peripheral edge portion of the lip portion, and the suction-adhering seal is caused to vibrate by periodically increasing and decreasing the relative angle between the lip portion and the extension.

According to the device of the present invention, when the vacuum generating means is energized, a fluid inside the pressure reduction space, such as the air or water, is discharged to the outside of the pressure reduction space. Thus, the pressure reduction space is reduced in pressure as desired. Once the pressure reduction space is so reduced in pressure, the pressure of an ambient fluid, such as the air, acting on the pressure reduction housing owing to the difference in fluid pressure between the inside and outside of the pressure reduction space is transmitted to the wall surface via the moving means. Under this ambient fluid pressure, the pressure reduction housing is caused to suction-adhere to the wall surface.

Also, the device of the present invention is constructed such that at least that portion of the suction-adhering seal which contacts the surface of the object vibrates, thereby decreasing the frictional force between the suction-adhering seal and the surface of the object. Thus, the device has a stable driving force.

Furthermore, the device of the present invention is constructed such that the suction-adhering seal is formed of a flexible material such as rubber, and has an annular lip portion extending outwardly from the inside of the pressure reduction space and along the surface of the object, an extension extending further outwardly and away from the surface of the object is connected to the peripheral edge portion of the lip portion, and the suction-adhering seal is caused to vibrate by periodically increasing and decreasing the relative angle between the lip portion and the extension. Thus, when applied to uses for suction-cleaning dirt, such as crud, deposited on the surface of the object mainly in a liquid, the device can effectively incorporate the crud on the surface of the object into the pressure reduction region by causing at least that portion of the suction-adhering seal which contacts the surface of the object to vibrate.

BRIEF DESCRIPTION OF THE DRAWINGS

FIG. 7 is a partially enlarged view, together with a diagram of a pneumatic circuit, showing a third preferred embodiment of the device constructed in accordance with the present invention in which an air cylinder, a valve plate and a packing are mounted in place of the air cylinder, vibrating plate and seal in the device of FIG. 5.

FIG. 8 is a partially enlarged view showing a fourth preferred embodiment of the device constructed in accordance with the present invention, illustrating a state in which fluid piping is mounted on the suction-adhering seal in the device of FIG. 4.

FIG. 9 is a partially enlarged view of the D portion in the device of FIG. 8.

FIG. 10 is a partially enlarged view showing a state in which the fluid piping in the device of FIG. 9 has expanded.

FIG. 15 is a partially enlarged view showing a sixth preferred embodiment of the device constructed in accordance with the present invention, illustrating a state in which an electric vibrator is mounted on the suction-adhering seal in place of the fluid piping in the device of FIG. 9.

FIG. 16 is a partially enlarged view showing a state in which the electric vibrator in the device of FIG. 15 has deformed upon application of an electric voltage.

FIG. 17 is a partially enlarged view showing a seventh preferred embodiment of the device constructed in accordance with the present invention, illustrating a state in which the thickness of the flat plate in the device of FIG. 9 has been increased.

FIG. 18 is a partially enlarged view showing a state in which the fluid piping in the device of FIG. 17 has expanded.

BEST MODE FOR CARRYING OUT THE INVENTION

Figure 1:
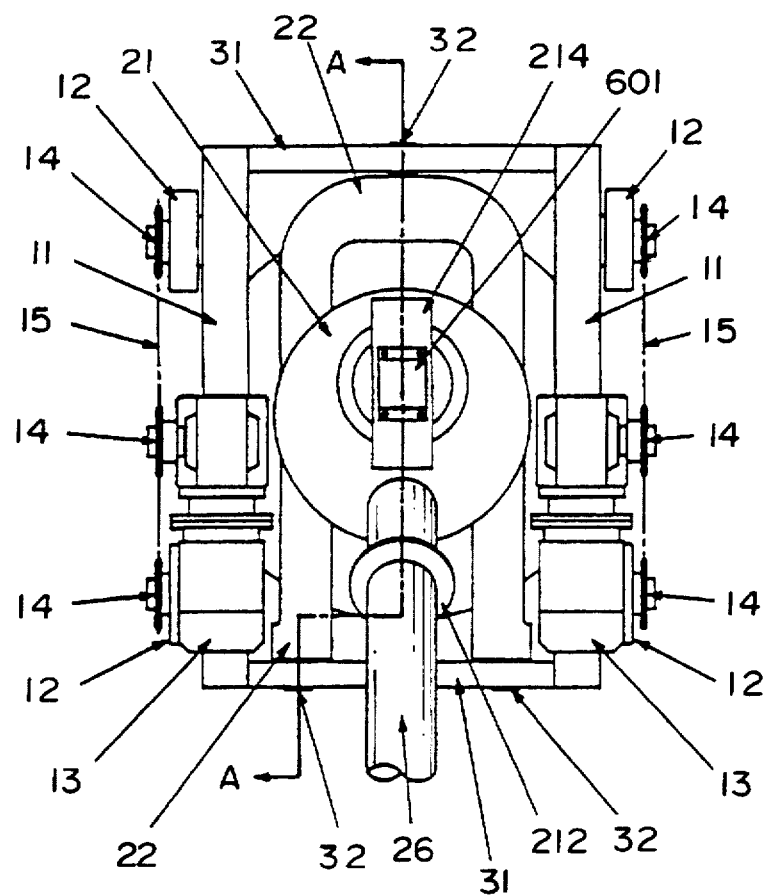
FIG. 1 is a plan view showing a first preferred embodiment of the device constructed in accordance with the present invention.
Figure 2:
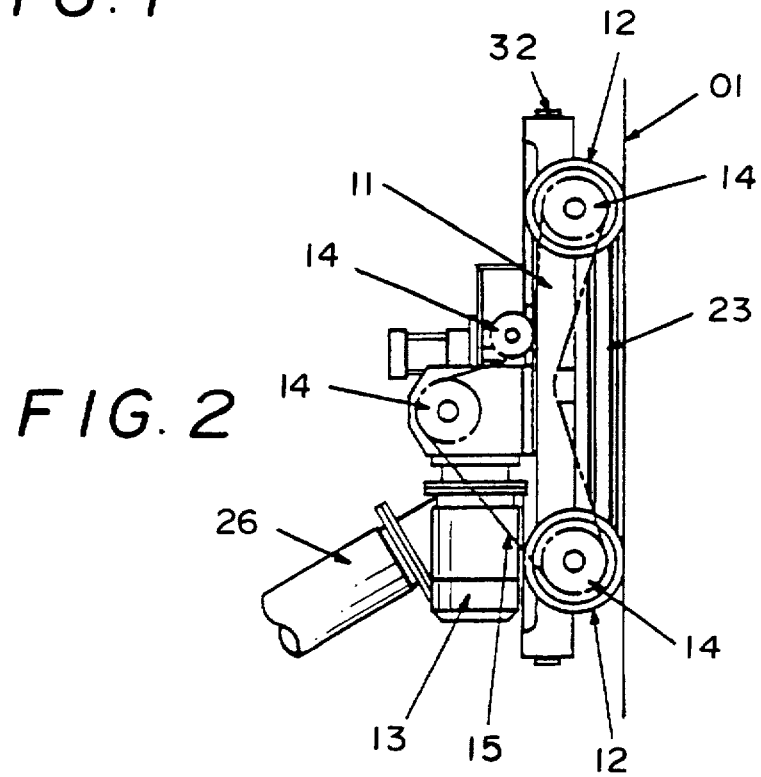
FIG. 2 is a right side view of the device shown in FIG. 1.

Preferred embodiments of the device constructed in accordance with the present invention will be described in further detail with reference to the accompanying drawings.

With reference to FIGS. 1 to 5, the illustrated device has a pressure reduction housing 21, and the pressure reduction housing 21 comprises a nearly columnar, inwardly hollow housing 210, an annular plate 211 welded to the outer peripheral edge portion of the opening portion of the housing 210, and a housing frame 22 welded to the housing 210.

At an outer edge portion of that surface of the annular plate 211 which faces a wall surface 01 is mounted a suction-adhering seal 23. The suction-adhering seal 23, optionally formed of a relatively flexible material such as urethane rubber or plastic, has an outside wall portion 232 extending from one end portion coupled by bolts and nuts 25 to the outer peripheral edge portion of the annular plate 211 as far as a connecting portion 233 close to the wall surface 01, and an inside wall portion 231 extending from that connecting portion 233 as far as the other end portion coupled by bolts and nuts 25 to the annular plate 211.

At the connecting portion 233 of the suction-adhering seal 23 is provided a lip portion 234 extending outwardly from the inside of a pressure reduction space 02. The lip portion 234 may be formed integrally with the connecting portion 233 as illustrated, or may be formed separately rather than integrally, and attached to the connecting portion 233.

The lip portion 234 has connected thereto an extension 235 extending further outwardly from its peripheral edge portion 237 and away from the wall surface 01.

Figure 3:
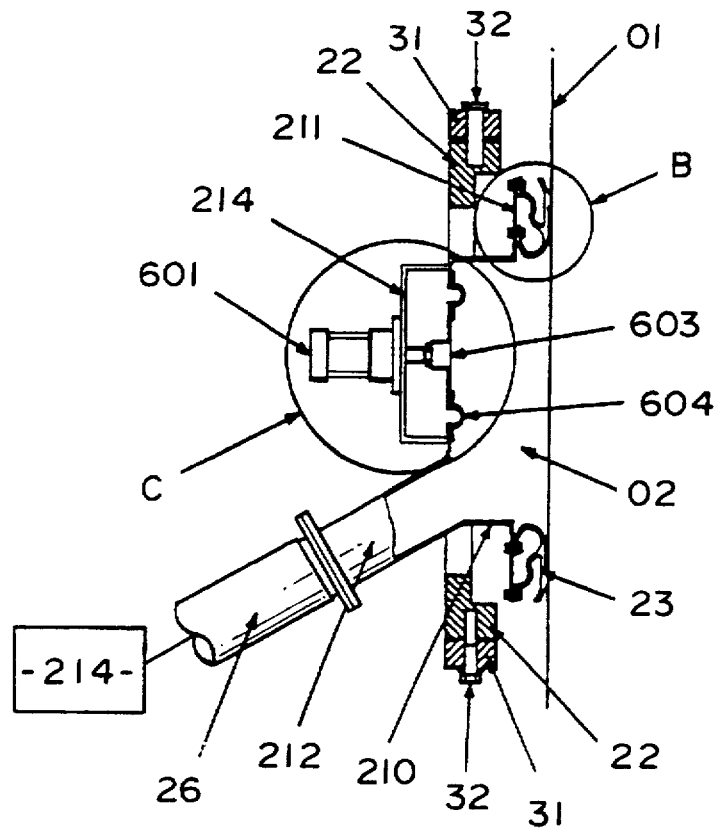
FIG. 3 is a sectional view taken on line A—A in the device of FIG. 1.
Figure 4:
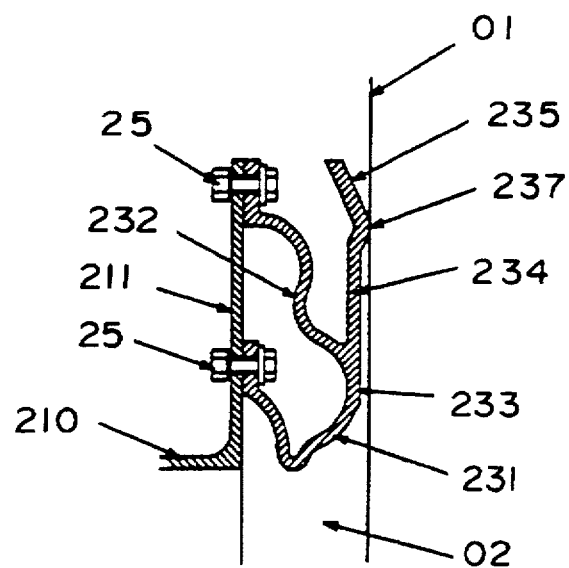
FIG. 4 is a partially enlarged view of the B portion in the device of FIG. 3.

The suction-adhering seal 23 having the lip portion 234, as will be seen from FIG. 3, is nearly toroidal as a whole, and the inside wall portion 231 and the lip portion 234 define the pressure reduction space 02 in cooperation with the housing 210, the annular plate 211 and the wall surface 01.

At a lower end portion of the housing 210 is provided a connecting pipe portion 212. The connecting pipe portion 212 is connected to a vacuum generating means such as a vacuum pump 214 via a suction hose 26.

Therefore, when the vacuum generating means (214) is energized, a fluid inside the pressure reduction space 02, such as the air, is discharged to the outside through the suction hose 26, and thus the pressure reduction space 02 is reduced in pressure as desired.

To an upper end portion and a lower end portion of the housing frame 22 are coupled by pins 32 a pair of auxiliary frames 31 with spacing. To a left end portion and a right end portion of the pair of auxiliary frames 31 are coupled by bolts and nuts (not shown) a pair of travel frames 11 with spacing.

On each of the pair of travel frames 11 are mounted one geared motor 13 and two wheels 12, as well as three sprockets 14 and one roller chain 15 so that their rotating shafts may rotate as a unity. One of the three sprockets 14 serves to adjust the tension of the roller chain 15.

In addition, the device of the present invention is constructed such that at least that portion of the suction-adhering seal 23 which contacts the wall surface 01 vibrates. A preferred embodiment of this device will be described with reference to FIGS. 3 and 5.

The housing 210 has a vibration source for causing fluid inside the pressure reduction space 02 to vibrate. The vibration source comprises an air cylinder 601, a circular vibrating plate 603 mounted on the end of the piston rod 602 of the air cylinder 601, an annular seal 604 formed of a flexible material such as rubber which is mounted in the annular space between a peripheral edge portion of a circular hole 213 made in the housing 210 and the vibrating plate 603, and a driving unit for the air cylinder 601.

Figure 5:
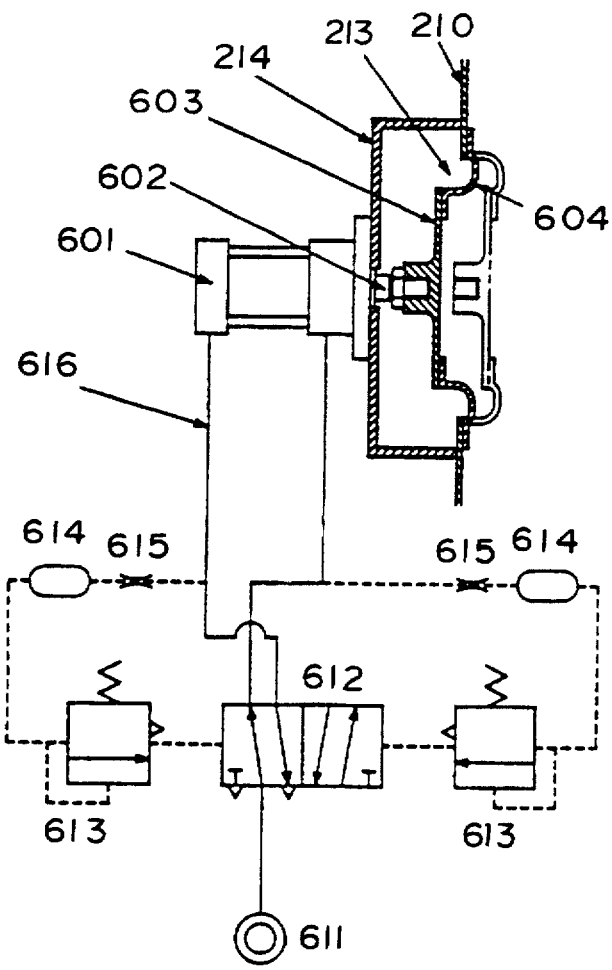
FIG. 5 is a partially enlarged view of the C portion in the device of FIG. 3, as well as a diagram of a pneumatic circuit.

In connection with the driving unit for the air cylinder 601, as illustrated in FIG. 5, a pneumatic circuit called a pneumatic oscillation circuit is connected to the air cylinder 601. The pneumatic circuit comprises an air compressor 611, a flip-flop valve 612, a relief valve 613, an air tank 614, and a throttle valve 615.

The air tank 614 and the throttle valve 615 function to attenuate a transient sharp rise in the pilot pressure of the flip-flop valve 612 taking place when the air cylinder 601 makes a forward or rearward motion.

Next, the actions of the above-described device will be explained briefly.

When the vacuum generating means (not shown) is energized, a fluid inside the pressure reduction space 02, such as the air, is discharged to the outside through the suction hose 26, and thus the pressure reduction space 02 is reduced in pressure as desired. Once the pressure reduction space 02 is thus reduced in pressure, the pressure of an ambient fluid acting on the pressure reduction housing 21, such as the air, owing to the difference in fluid pressure between the inside and outside of the pressure reduction space 02 is transmitted to the wall surface 01 via the auxiliary frames 31, travel frames 11, and wheels 12. In this manner, the device of the present invention is caused to suction-adhere to the wall surface 01 by the pressure of the ambient fluid.

While the device is suction-adhering to the wall surface 01, the peripheral edge portion 237 of the lip portion 234 is brought into intimate contact with the wall surface 01 under the pressure of the ambient fluid. Hence, the peripheral edge portion 237 inhibits with its full strength the flow of the ambient fluid into the pressure reduction space 02 through the contacted parts.

When the driving unit for the air cylinder 601 is actuated during the suction-adhesion of the device to the wall surface 01, the air cylinder 601 makes a backward movement first. When it reaches the stroke end of its backward movement, the internal pressure on the drawing side of the air cylinder 601 rises to actuate the relief valve 613. The pilot pressure that has passed this relief valve 613 effects changeover of the flip-flop valve 612.

On this occasion, the air cylinder 601 is switched to a forward movement. When it reaches the stroke end of its forward movement, the internal pressure on the pushing side of the air cylinder 601 rises to actuate the relief valve 613. The pilot pressure that has passed this relief valve 613 switches the flip-flop valve 612 again to the state illustrated in FIG. 5. Thereafter, the air cylinder 601 automatically repeats similar backward and forward movements and vibrates, whereby the vibrating plate 603 is also caused to vibrate.

The vibrations of this vibrating plate 603 form a wave source for causing fluid inside the pressure reduction space 02 to vibrate. The waves radiated into the fluid propagate through the fluid to cause the lip portion 234 of the suction-adhering seal 23 to vibrate.

As the lip portion 234 of the suction-adhering seal 23 is vibrating when the device is about to ascend the wall surface 01 in the state of its suction-adhesion to the wall surface 01, the frictional force between the wall surface 01 and the lip portion 234 becomes a dynamic frictional force. The value of this dynamic frictional force is smaller than that of a static frictional force occurring when the lip portion 234 of the suction-adhering seal 23 is not vibrating. Thus, the device obtains a greater driving force and is able to start an upward movement.

Figure 6:
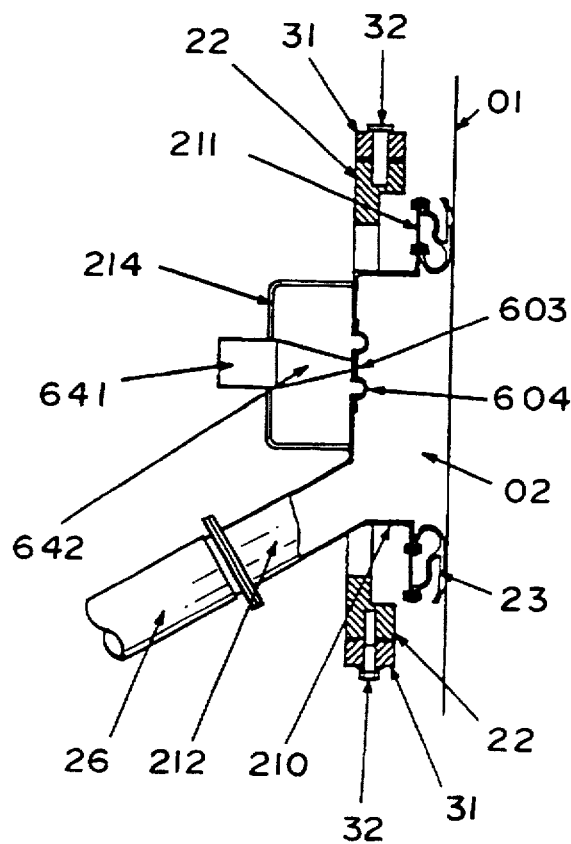
FIG. 6 is a sectional view showing a second preferred embodiment of the device constructed in accordance with the present invention in which an electrical vibrator is used in place of the air cylinder in the device of FIG. 3.

In the device as the above-described preferred embodiment, the air cylinder 601 was used as an actuator for making the vibrating plate 603 vibrate, but a hydraulic cylinder may be used. Alternatively, as shown in FIG. 6, an electric vibrator 641 such as a magnetostriction vibrator or a piezoelectric ceramic vibrator may be used in place of the air cylinder or hydraulic cylinder.

In case the electric vibrator 641 is used as the actuator for the vibration source, a frequency oscillator (not shown) for periodically applying an electric voltage is connected to the electric vibrator 641.

When the device as the above-described preferred embodiment is used in a liquid, a high frequency imparted to the vibration source would make it possible to radiate ultrasound into the liquid inside the pressure reduction space 02. In this case, a high sound pressure and a strong power can be propagated into the liquid even when the vibratory displacement of the vibrating plate 603 is small. Radiation of a strong ultrasound into the liquid can easily arouse cavitation. Once cavitation occurs in the liquid, appearance and disappearance of cavities in the liquid are repeated. When the cavities vanish, a huge pressure occurs, thus causing the lip portion 234 of the suction-adhering seal 23 to vibrate effectively.

The device of the present invention, as shown in the foregoing preferred embodiment, is constructed such that at least that portion of the suction-adhering seal 23 which contacts the wall surface 01 is caused to vibrate. Another preferred embodiment will be described with reference to FIG. 7.

The housing 210 has a vibration source for causing fluid inside the pressure reduction space 02 to vibrate. The vibration source comprises an air cylinder 601, a circular valve plate 643 mounted on the end of the piston rod 602 of the air cylinder 601, an annular packing 644 formed of a flexible material such as rubber which is mounted on the peripheral edge portion of a circular hole 213 made in the housing 210, and a driving unit for the air cylinder 601.

The driving unit for the air cylinder 601 is similar to the one illustrated in FIG. 5. A pneumatic circuit called a pneumatic oscillation circuit is connected to the air cylinder 601. The pneumatic circuit comprises an air compressor 611, a flip-flop valve 612, a relief valve 613, an air tank 614, and a throttle valve 615.

Next, the actions of the above-described device will be explained briefly.

When the driving unit for the air cylinder 601 is actuated during the suction-adhesion of the device to the wall surface 01, the air cylinder 601 makes a backward movement first. When the valve plate 643 closes the circular hole 213, the internal pressure on the drawing side of the air cylinder 601 rises to actuate the relief valve 613. The pilot pressure that has passed this relief valve 613 effects changeover of the flip-flop valve 612.

On this occasion, the air cylinder 601 is switched to a forward movement. When it reaches the stroke end of its forward movement, the internal pressure on the pushing side of the air cylinder 601 rises to actuate the relief valve 613. The pilot pressure that has passed this relief valve 613 switches the flip-flop valve 612 again to the state illustrated in FIG. 5. Thereafter, the air cylinder 601 automatically repeats similar backward and forward movements and vibrates, whereby the valve plate 643 is also caused to vibrate and repeats the opening and closing of the valve.

The vibrations of this valve plate 643 permit fluid outside the pressure reduction space 02 to flow periodically into the pressure reduction space 02, thereby forming a wave source for causing fluid inside the pressure reduction space 02 to vibrate. The waves radiated into the fluid propagate through the fluid to cause the lip portion 234 of the suction-adhering seal 23 to vibrate.

In the device as the above-described preferred embodiment, the air cylinder 601 was used as the actuator for making the vibrating plate 603 vibrate, but a hydraulic cylinder may be used.

The device of the present invention, as shown in the foregoing preferred embodiment, has the vibration source for causing fluid inside the pressure reduction space 02 to vibrate. By actuating this vibration source, this device transmits the vibrations to at least that portion of the suction-adhering seal 23 which contacts the wall surface. Another preferred embodiment, which does not transmit the vibrations to the suction-adhering seal 23 through the fluid inside the pressure reduction space 02, but which has a vibration source for directly causing the suction-adhering seal 23 to vibrate, and actuates the vibration source, thereby transmitting the vibrations to the suction-adhering seal 23, will be described with reference to FIGS. 8 through 12.

Figure 12:
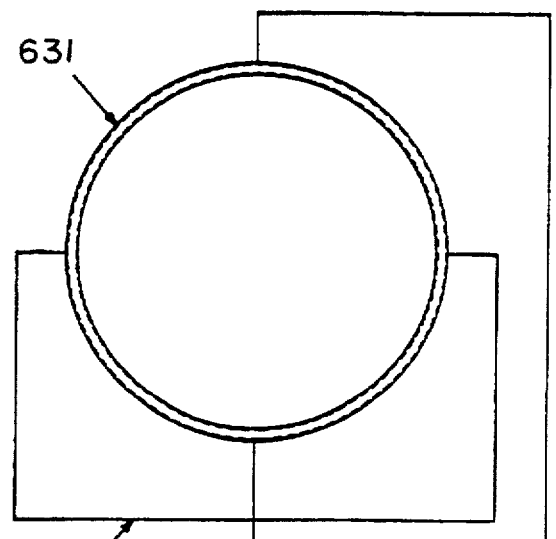
FIG. 12 is a schematic representation of the fluid piping in the device of FIG. 8, as well as a diagram of a pneumatic circuit.

The vibration source, as schematically shown in FIG. 12, at least comprises an entirely annular, hose-like fluid piping 631 of a flexible material such as rubber which is mounted on the suction-adhering seal 23; and a system for periodically repeating the admission of a fluid into and its discharge from the fluid piping 631 through a piping hose 616 connected to four places of the fluid piping 631; the system comprising an air compressor 611, a solenoid valve 617, and a frequency oscillator (not shown) for periodically applying an electric voltage to the solenoid valve 617.

Figure 11:
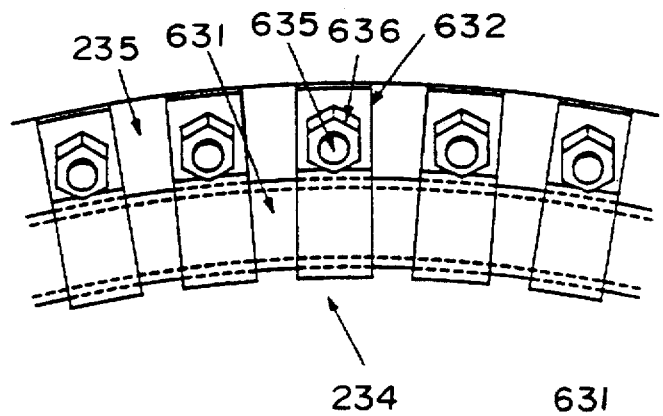
FIG. 11 is a partially enlarged plan view showing the device of FIG. 9 as viewed from the side opposite to the wall surface.

The fluid piping 631, as shown in FIG. 11, is held at the extension 235 of the suction-adhering seal 23 by means of a multiplicity of holding fitments 632, bolts 635 and nuts 636. Details of this holding portion are as illustrated in FIG. 9 showing an enlarged section of the holding portion. As shown there, at the extension 235 of the suction-adhering seal 23, plate springs 633 made by bending band plates of a spring steel as illustrated, and the holding fitments 632 formed by bending band plates of a steel as illustrated are fixed by the bolts 635 having flat plates 634 of steel welded to their head, and by nuts 636. The fluid piping 631 is held sandwiched between the plate springs 633 and the holding fitments 632.

Next, the actions of the device as describe above will be summarized.

In FIG. 12, when no electric voltage is applied to the solenoid valve 617, compressed air is injected into the fluid piping 631, whereby the fluid piping 631 expands. When an electric voltage is applied to the solenoid valve 617, compressed air within the fluid piping 631 is discharged to the outside, whereby the fluid piping 631 contracts.

FIG. 9 shows a state in which the fluid piping 631 is contracting, while FIG. 10 shows a state in which the fluid piping 631 is expanding. As illustrated in FIG. 10, when the fluid piping 631 expands, the holding fitments 632 bring the extension 235 toward the wall surface 01 in opposition to the elasticity of the plate springs 633. When the fluid piping 631 contracts, the standard state depicted in FIG. 9 is restored by the elastic force of the plate springs 633.

In the device described above, when an electric voltage is periodically applied to the solenoid valve 617 by use of a frequency oscillator (not shown), the fluid piping 631 repeats expansion and contraction upon the periodical injection and discharge of compressed air. That is, the relative angle between the lip portion 234 and the extension 235 is periodically increased and decreased, whereby the suction-adhering seal 23 vibrates.

Since the suction-adhering seal 23 so vibrates, the frictional force between the suction-adhering seal 23 and the wall surface 01 which it contacts becomes less. In addition to this decrease in the frictional force, the vibrations by the suction-adhering seal 23 produce the effects to be described below.

With reference to FIGS. 17 and 18, the device illustrated in these drawings is different from the device shown in FIGS. 9 and 10 only in the fact that the thickness of the flat plate 634 welded to the head of the bolt 635 is larger.

In FIG. 18, when the fluid piping 631 expands and the extension 235 of the suction-adhering seal 23 approaches the wall surface 01, the peripheral edge portion 237 of the lip portion 234 of the suction-adhering seal 23 slightly separates from the wall surface 01. Thus, fluid outside of the device flows into the pressure reduction space 02 through that site of separation, whereby foreign matter 03, such as dirt, deposited on the wall surface 01 is sucked and collected into the pressure reduction space 02.

When the above-described device is applied to uses for suction-cleaning dirt, such as crud, deposited on the surface of an object mainly in a liquid, it can effectively incorporate the dirt such as crud on the surface of the object into the pressure reduction space 02 by causing at least that portion of the suction-adhering seal 23 contacting the surface of the object to vibrate by, say, the above-mentioned method.

In the foregoing device according to the preferred embodiment of the present invention, fluid to flow into the fluid piping is compressed air, but it may be a liquid.

In the above device as the preferred embodiment of the present invention, it is important that a fluid piping or fluid cylinder which vibrates upon the periodical injection and discharge of fluid be provided as a vibration source for directly causing the suction-adhering seal to vibrate, and that vibrations be transmitted to the suction-adhering seal by the actuation of the vibration source. In addition to this preferred embodiment, various other embodiments are conceivable to fulfill this requirement.

In regard to the material and shape of the suction-adhering seal, various materials or shapes can be considered besides those exemplified in the aforementioned preferred embodiments.

It is also worth considering to produce the suction-adhering seal and the fluid piping by monolithic molding.

The above device as the preferred embodiment of the present invention adopts the following method for causing the lip portion 234 of the suction-adhering seal 23 to vibrate: The fluid piping 631 of a flexible material is mounted on the suction-adhering seal 23. Compressed air is periodically injected into and discharged from the fluid piping 631 to repeat its expansion and contraction, thereby periodically increasing and decreasing the relative angle between the lip portion 234 and the extension 235 to cause the suction-adhering seal 23 to vibrate. Another preferred embodiment in which an electric vibrator is mounted on the suction-adhering seal 23 as a replacement for the fluid piping 631 to serve as the vibration source will be described with reference to FIGS. 15 and 16.

In FIG. 15, a piezoelectric ceramic vibrator 651 is mounted on the lip portion 234 and the extension 235 of the suction-adhering seal 23 by use of an adhesive. Upon application of an electric voltage to the piezoelectric ceramic vibrator 651, the piezoelectric ceramic vibrator 651 deforms and the extension 235 approaches the wall surface 01, as shown in FIG. 16.

That is, the vibration source at least comprises an electric vibrator, such as the piezoelectric ceramic vibrator 651, mounted on the lip portion 234 and the extension 235 of the suction-adhering seal 23; and a frequency oscillator (not shown) for periodically applying an electric voltage to the electric vibrator; and the electric vibrator periodically repeats expansion and contraction upon the actuation of the frequency oscillator, thereby periodically increasing and decreasing the relative angle between the lip portion 234 and the extension 235 to cause the suction-adhering seal 23 to vibrate.

In the above device as the preferred embodiment of the present invention, it is important that an electric vibrator be provided as a vibration source for directly causing the suction-adhering seal to vibrate, and that vibrations be transmitted to the suction-adhering seal by the actuation of the vibration source. In addition to this preferred embodiment, various other embodiments are conceivable to fulfill this requirement.

The above device as the preferred embodiment of the present invention adopts the following method for causing the lip portion 234 of the suction-adhering seal 23 to vibrate: The fluid piping 631 of a flexible material is mounted on the suction-adhering seal 23. Compressed air is periodically injected into and discharged from the fluid piping 631 to repeat its expansion and contraction, thereby periodically increasing and decreasing the relative angle between the lip portion 234 and the extension 235 to cause the suction-adhering seal 23 to vibrate. Alternatively, the electric vibrator 651 is used in place of the fluid piping 631 to cause the lip portion 234 of the suction-adhering seal 23 to vibrate. Another preferred embodiment in which aeration within the fluid piping 631 is used as a vibration source for the lip portion 234 will be described with reference to FIGS. 13 and 14.

Figure 13:
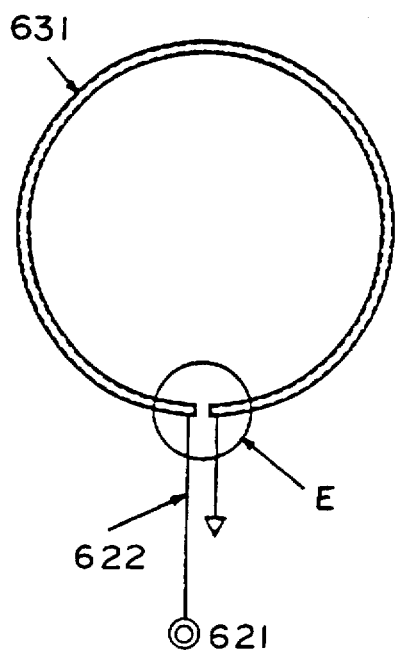
FIG. 13 is a schematic representation of the fluid piping and a diagram of a hydraulic circuit for a fifth preferred embodiment of the device constructed in accordance with the present invention.

The vibration source, as schematically shown in FIG. 13, at least comprises an entirely annular, hose-like fluid piping 631 of a flexible material such as rubber which is mounted on the suction-adhering seal 23; and a liquid pump 621 for injecting a liquid into the fluid piping 631 through a piping hose 622 connected to both-end portions of the fluid piping 631.

The fluid piping 631 is held at the extension 235 of the suction-adhering seal 23 by means of a multiplicity of holding fitments 632, bolts 635 and nuts 636 (not shown) in the same manner as for the device illustrated in FIGS. 8 to 11.

Figure 14:
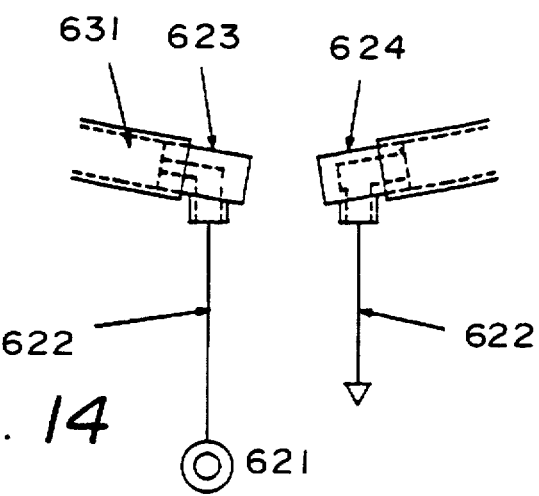
FIG. 14 is a partially enlarged view of the E portion in the device of FIG. 13.

Also, as shown in FIG. 14, a passage barrier member/hose joint 623 formed in a nozzle form is mounted at an end portion on the inlet side of the fluid piping 631. At an end portion on the outlet side thereof is mounted a hose joint 624 of a relatively large bore which does not make a barrier to the passage.

Next, the actions of the above-described device will be explained briefly.

When the liquid pump 621 is actuated, and a high pressure liquid ejected from the liquid pump 621 passes the passage barrier member 623, the bore of the passage abruptly changes at the nozzle portion of the passage barrier member 623, with the result that the flow of the liquid radically changes. On this occasion, the kinetic energy of the liquid turns into a pressure energy, thus causing sudden changes in pressure, so that the liquid inside the passage repeats pressure changes vibratingly, a phenomenon called aeration. Once this aeration occurs, appearance and disappearance of cavities in the liquid are repeated. When the cavities vanish, a huge pressure occurs, thus causing the lip portion 234 of the suction-adhering seal 23 to vibrate effectively.

The above device as the preferred embodiment is provided with one fluid piping 631 and one passage barrier member 623. If desired, however, this fluid piping may be divided into a suitable number of segments, and a suitable number of the fluid passage members may be disposed.

The preferred embodiments of the device according to the present invention have been described hereinbefore. In addition to these preferred embodiments, various other embodiments may be considered in accordance with the scope of the claims.

The device of the present invention is constructed such that at least that portion of the suction-adhering seal which contacts the surface of an object vibrates. Thus, there is provided a device capable of suction-adhering to and moving along the surface of the object, which decreases the frictional force between the suction-adhering seal and the surface of the object and so has a stable driving force.

The device of the present invention is also constructed such that at least that portion of the suction-adhering seal which contacts the surface of an object vibrates. Thus, there is provided a device capable of suction-adhering to and moving along the surface of the object, which can suction-clean dirt, such as crud, deposited on the surface of the object by effectively incorporating it into the pressure reduction region.

I claim:

1. A device capable of suction-adhering to and moving along the surface of an object, which device has a pressure reduction housing, a plurality of wheels for engaging said surface, moving means for rotating said wheels, a suction-adhering seal mounted on the pressure reduction housing and defining a pressure reduction space in cooperation with the pressure reduction housing and the surface of the object, and vacuum generating means for discharging a fluid from the pressure reduction space to the outside of the pressure reduction space, and which device suction-adheres to the surface of the object by the pressure of an ambient fluid acting on the pressure reduction housing owing to the difference in fluid pressure between the inside and the outside of the pressure reduction space, and moves along the surface of the object by the action of the moving means; means for producing a dynamic friction force between the suction-adhering seal and the surface of the object by vibrating at least that portion of the suction-adhering seal which contacts the surface of the object.

2. The device of claim 1 which has a vibration source for causing fluid inside the pressure reduction space to vibrate, and which transmits vibrations to the suction-adhering seal by actuating the vibration source.

3. The device of claim 2 wherein the vibration source at least comprises a vibrating plate, and an actuator for vibratingly driving the vibrating plate.

4. The device of claim 2 wherein the vibration source at least comprises a valve which periodically repeats opening and closing for admitting fluid outside the pressure reduction space periodically into the pressure reduction space; and an actuator for driving the valve so as to open and close.

5. The device of claim 1 wherein the means for producing a dynamic friction force comprises a vibration source for directly causing the suction-adhering seal to vibrate, and actuates the vibration source, thereby transmitting vibrations to the suction-adhering seal.

6. The device of claim 5 wherein the vibration source at least comprises fluid piping of a flexible material mounted on the suction-adhering seal; and a fluid pump and a fluid control valve for periodically repeating the injection of a fluid into and its discharge from the fluid piping; and upon the periodical injection and discharge of the fluid, the fluid piping periodically repeats expansion and contraction to generate vibrations.

7. The device of claim 5 wherein the vibration source at least comprises an electric vibrator, mounted on the suction-adhering seal; and a frequency oscillator for periodically applying an electric voltage to the electric vibrator; and the electric vibrator periodically repeats expansion and contraction upon the actuation of the frequency oscillator to generate vibrations.

8. The device of claim 5, wherein the suction-adhering seal formed of a flexible material such as rubber has an annular lip portion extending outwardly from the inside of the pressure reduction space and along the surface of the object, an extension extending further outwardly and away from the surface of the object is connected to the peripheral edge portion of the lip portion, and the suction-adhering seal is caused to vibrate by periodically increasing and decreasing the relative angle between the lip portion and the extension.

9. The device of claim 5 wherein the vibration source at least comprises fluid piping mounted on the suction-adhering seal and having halfway in its passage a passage barrier member for hindering the smooth flow of a fluid being a liquid; and a fluid pump for injecting a liquid into the fluid piping; and the fluid piping vibrates by the action of aeration occurring when the liquid passes through the passage barrier member.

10. The device of claim 6, wherein the suction-adhering seal formed of a flexible material such as rubber has an annular lip portion extending outwardly from the inside of the pressure reduction space and along the surface of the object, an extension extending further outwardly and away from the surface of the object is connected to the peripheral edge portion of the lip portion, and the suction-adhering seal is caused to vibrate by periodically increasing and decreasing the relative angle between the lip portion and the extension.

11. The device of claim 7, wherein the suction-adhering seal formed of a flexible material such as rubber has an annular lip portion extending outwardly from the inside of the pressure reduction space and along the surface of the object, an extension extending further outwardly and away from the surface of the object is connected to the peripheral edge portion of the lip portion, and the suction-adhering seal is caused to vibrate by periodically increasing and decreasing the relative angle between the lip portion and the extension.

* * * * *